United States Patent
Xu et al.

(10) Patent No.: US 11,814,331 B2
(45) Date of Patent: Nov. 14, 2023

(54) METHOD FOR REDUCING PROPELLANT CURING RESIDUAL STRESS BY HIGH-ENERGY ACOUSTIC BEAM

(71) Applicant: BEIJING INSTITUTE OF TECHNOLOGY, Beijing (CN)

(72) Inventors: Chunguang Xu, Beijing (CN); Peng Yin, Beijing (CN); Yuren Lu, Beijing (CN); Ruili Jia, Beijing (CN); Jianfeng Song, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 510 days.

(21) Appl. No.: 16/751,731

(22) Filed: Jan. 24, 2020

(65) Prior Publication Data
US 2020/0346991 A1 Nov. 5, 2020

(30) Foreign Application Priority Data

Jan. 31, 2019 (CN) .......................... 201910098385.2

(51) Int. Cl.
*C06B 21/00* (2006.01)
*B29C 35/08* (2006.01)

(52) U.S. Cl.
CPC .......... *C06B 21/0091* (2013.01); *B29C 35/08* (2013.01); *C06B 21/0058* (2013.01)

(58) Field of Classification Search
None
See application file for complete search history.

(56) References Cited

U.S. PATENT DOCUMENTS

| 7,188,993 B1* | 3/2007 | Howe | ..................... B06B 1/161 366/128 |
| 2010/0294113 A1* | 11/2010 | McPherson | ......... C06B 21/0025 149/109.6 |

FOREIGN PATENT DOCUMENTS

| CN | 103076821 A | 5/2013 |
| CN | 208287931 U | 12/2018 |

OTHER PUBLICATIONS

The State Intellectual Property Office of People's Republic of China First Office Action dated Mar. 4, 2020.

* cited by examiner

*Primary Examiner* — Aileen B Felton
(74) *Attorney, Agent, or Firm* — Shumaker, Loop & Kendrick, LLP; John A. Miller

(57) ABSTRACT

The present disclosure is related to the technical field of propellant performance research, and in particular, to a method for reducing propellant curing residual stress by a high-energy acoustic beam. The method includes the following steps: injecting a propellant slurry into a curing container and waiting for the propellant slurry to start curing; actuating, when the propellant slurry starts curing, a high-energy acoustic beam generator and a high-energy acoustic beam transducer to continuously emit high-energy acoustic beam to the propellant slurry in the curing container until the propellant slurry is cured to form a propellant grain; and closing the high-energy acoustic beam generator and the high-energy acoustic beam transducer. The method for reducing propellant curing residual stress by high-energy acoustic beam provided in the present disclosure can reduce residual stress inside the propellant in an effective manner, thereby ensuring operation safety of the aerospace equipment.

9 Claims, 2 Drawing Sheets

METHOD FOR REDUCING PROPELLANT CURING RESIDUAL STRESS BY HIGH-ENERGY ACOUSTIC BEAM

CROSS-REFERENCE TO RELATED APPLICATION

This application claims priority to Chinese Patent Application No. 201910098385.2, filed on Jan. 31, 2019 and titled "Method for Reducing Propellant Curing Residual Stress by High-Energy Acoustic Beam", which is incorporated herein by reference in its entirety.

TECHNICAL FIELD

The present disclosure is related to the technical field of propellant performance research, and in particular, to a method for reducing propellant curing residual stress by high-energy acoustic beam.

BACKGROUND

With the role of aerospace industry in economic development growing and significant, safety demand of the aerospace industry in engineering applications is increased. A propellant is an important space fuel, and its mechanical property and stability have a strong impact on operation safety of aerospace equipment. The present of residual stress of the propellant may directly result in that phenomena such as crack, fracture and the like appear in a propellant grain, which directly threatens operation safety of the aerospace equipment. Therefore, in order to ensure operation safety of the aerospace equipment, it is necessary to reduce the residual stress in the propellant.

There are many known methods and devices for reducing residual stress in metallic materials, such as annealing, tempering, vibration shocking and the like, but there are few methods for reducing the residual stress in the propellant that is non-metallic and has a stage in a colloidal state. For example, patent application for invention (application number CN 201410099482.0) named Residual Stress Eliminating device based on high-energy acoustic and magnetic coupling principle discloses a device for eliminating residual stress of metallic materials introduced during processing such as cutting, heat treatment, and welding. For another example, patent application for utility model (application number CN 03219437.4) named Portable Vibration Processing Device for Eliminating Welding Residual Stress discloses a device capable of significantly eliminating welding residual stress and improving bearing capacity and fatigue life of welding structures. The above two documents each is related to devices for eliminating the residual stress of metallic materials, and the methods and devices involved are relatively complicated. There is no disclosure in each of the documents on a method or device for reducing residual stress of the propellant that is non-metallic and has a stage in a colloidal state. Therefore, the study on reducing of residual stress in the propellant is still the focus of the field.

SUMMARY

The present disclosure provides a method for reducing propellant curing residual stress by a high-energy acoustic beam, so as to reduce the residual stress in the propellant in an effective manner and ensure the operation safety of the aerospace equipment.

The disclosure provides a method for reducing propellant curing residual stress by high-energy acoustic beam, which comprises the following steps: a step S1, in which a propellant slurry is injected into a curing container as to wait for the propellant slurry to start curing; a step S2, in which when the propellant slurry starts curing, a high-energy acoustic beam generator and a high-energy acoustic beam transducer are actuated to continuously emit high-energy acoustic beam to the propellant slurry in the curing container until the propellant slurry is cured to form a propellant grain; a step S3, in which the high-energy acoustic beam generator and the high-energy acoustic beam transducer are closed.

The method for reducing propellant curing residual stress by high-energy acoustic beam provided in the present disclosure introduces continuously, the high-energy acoustic beam sensitive to the stress during the whole curing process from the propellant slurry to the propellant grain. On one hand, the high-frequency fluctuation energy of the high-energy acoustic beam is provided to the propellant slurry in the curing process according to the plasticity-inducing effect of the high-energy acoustic beam to enhance the mechanical properties of the propellant slurry, which is sufficient to overcome and counteract the energy that causes the propellant slurry to produce residual stress when the propellant cures, thereby reducing, when the propellant cures, the internal residual stress that is possible to be formed, and thus reducing the residual stress inside the propellant in an effective manner and effectively ensuring operation safety of the aerospace equipment. On the other hand, the high-energy acoustic beam with high-frequency and small-amplitude may make the particles of the propellant slurry more compact, improve leveling property of the surface of the propellant slurry and facilitate escaping of the air in the propellant slurry, so as to improve the mechanical properties and stability of the propellant slurry, make the propellant slurry to reduce or prevent forming of the internal residual stress, eliminate the residual stress inside the propellant in an effective manner, and ensure operation safety of the aerospace equipment likewise.

In some embodiments, the method further comprises a step S21 before or during the step S2, in which an operating frequency and a voltage of the high-energy acoustic beam is adjusted based on a frequency of the high-energy acoustic beam transducer to ensure phases of an output voltage and an output current consistent.

Accordingly, this may achieve a better modification effect, that is, modification effect of the high-energy acoustic beam on the propellant slurry is made better, and resist generation of the residual stress in the propellant in a more effective manner.

In some embodiments, the method may further comprise adjusting the operating frequency and the voltage of the high-energy acoustic beam based on a waveform change displayed by an oscilloscope in the step S2.

Accordingly, by adjusting the operating frequency and the voltage of the high-energy acoustic beam at any time, the energy level of the emitted high-energy acoustic beam can be adjusted at any time, so that the high-energy acoustic beam can continuously be inputted in an suitable energy level so as to maintain a desirable modification state, and achieve a better modification result, which is to further resist the generation of residual stresses inside the propellant in an effective manner, effectively improve the mechanical properties and stability of the propellant slurry, and also effectively resist the generation of residual stresses inside the propellant.

In some embodiments, the method further comprises a step S22 before the step S2, in which a curing period of time is calculated based on a volume of the injected propellant slurry and a frequency of the high-energy acoustic beam transducer, a timing of a timing alarm device is set based on the calculated curing period of time, and the timing alarm device is actuated; and the step S3 further comprises issuing, by the timing alarm device, an any one or more of alarms of bell-ringing, flashing and the like after the propellant slurry is formed as the propellant grain.

In this way, an operator need not to monitor at all times and can do other works at the same time at a position where the bell-ring can be seen or the flashing can be heard without conflict, which saves time of the operator and improves work efficiency.

In some embodiments, the method further comprises automatically closing, after a predetermined period of time since the timing alarm device issues any one of more of the alarms of the bell-ringing, the flashing and the like in the step S3, the high-energy acoustic beam transducer and the high-energy acoustic beam generator to stop working if the alarm(s) generated from the timing alarm device is not stopped.

In this way, even if the operator fails to see the flashing or hear the bell-ring to turn off the power source in time and stop the modification by the high-energy acoustic beam, the modification can be automatically closed and stopped, which not only improves the safety of the method, but also saves power, reduces the loss of the machines, prolongs the service life of the machines and saves cost. In addition, the preset period of time can be set to an arbitrary time in advance for the timing alarm device.

In some embodiments, the method further comprises a step S41 after the step S3, in which one of an upper separated part and a lower separated part of the curing container, which are connected to each other in a tight and sealed manner and separable up and down, is removed, and the propellant grain is taken out from the curing container.

By separating the two separated parts, it is possible to take the cured propellant grain out from the curing container in a complete and non-destructive manner. Therefore, the operation is simplified with reduced time and effort, and the curing container can be reused multiple times, which is more economical and cost-effective.

In some embodiments, the method further comprises a step S42 after the step S3, in which one of a left separated part and a right separated part of the curing container, which are connected to each other in a tight and sealed manner and separable left and right, is removed, and the propellant grain is taken out from the curing container.

By separating the two separated parts, it is possible to take the cured propellant grain out from the curing container in a complete and non-destructive manner. Therefore, the operation is simplified with reduced time and effort, and the curing container can be reused multiple times, which is more economical and cost-effective.

In some embodiments, the method further comprises coating a layer of release agent on an inner surface of the curing container before the step S1.

This may make easier for the cured propellant grain to come off when it is taken out, make easier for the propellant grain to be taken out completely, ensure integrity of the propellant grain and facilitate repeated multiple use of the curing container.

In some embodiments, the method further comprises a step S0 before the step S1 or the step S2, in which a coupling agent is evenly coated on a portion of the curing container with which the high-energy acoustic beam transducer contacts, and the curing container and the high-energy acoustic beam transducer are coupled in a thigh and stable manner.

The coating of the coupling agent in covering and uniform manner may ensure uniform and complete incidence of the high-energy acoustic beam, ensure accuracy of adjustment during the modification, and ensure the accuracy of adjustment data. The adjustment data can be retained and stored to improve efficiency of subsequent process. Further, the coupling of the curing container and the high-energy acoustic beam transducer in a thigh and stable manner may ensure an effective modification of the high-energy acoustic beam on the propellant slurry during the curing process, resulting in a better modification, and further ensure an effective resistance to the generation of residual stress inside the propellant.

It is appreciated that the above general description and the following description of details are merely exemplary, and should not limit the present disclosure.

The figures herein are incorporated into the description and constitute a part of the description, illustrate embodiments consistent with the present disclosure, and serve to explain the principles of the disclosure together with the description.

REFERENCE SIGNS

10—curing container
101—injection inlet
20—propellant slurry
30—high-energy acoustic beam transducer
301—contact surface
302—high-energy acoustic beam source
40—support structure

DETAILED DESCRIPTION

The following further describes the present disclosure in detail by specific embodiments with reference to the accompanying drawings.

Figure 1:
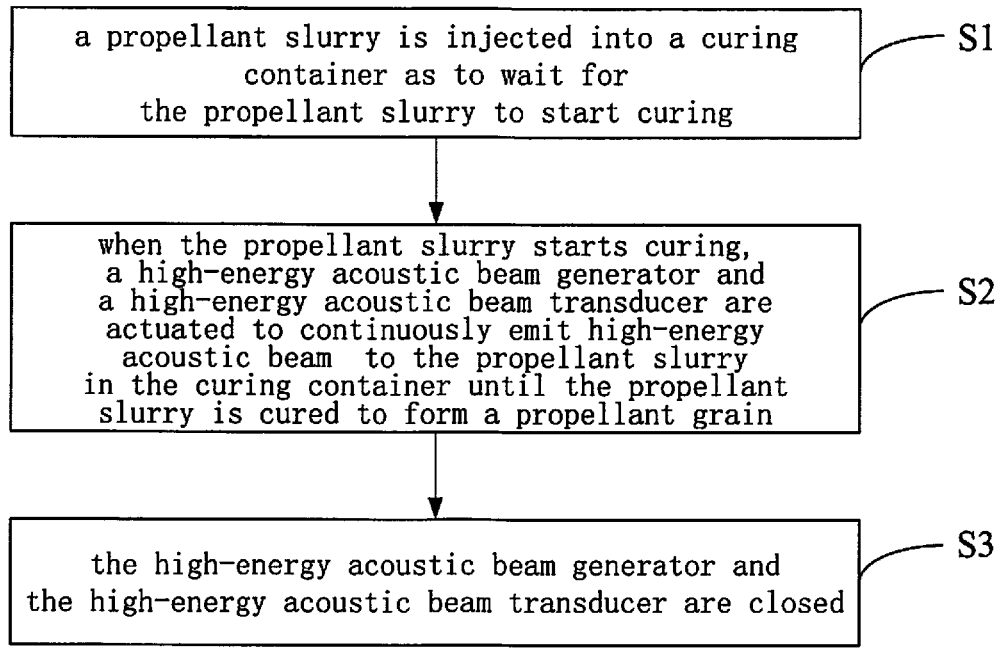
FIG. 1 is a flowchart of a method for reducing propellant curing residual stress by high-energy acoustic beam according to an embodiment of the present disclosure.
Figure 2:
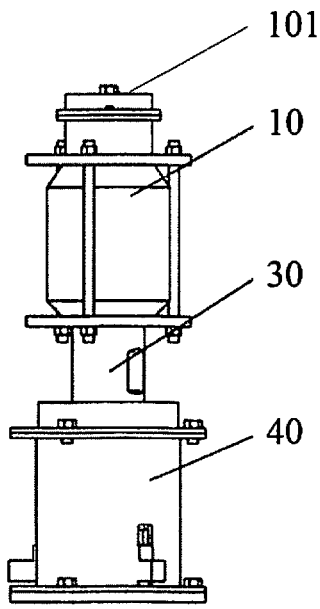
FIG. 2 is a structural schematic diagram of a device applying the method for reducing propellant curing residual stress by high-energy acoustic beam according to an embodiment of the present disclosure.
Figure 3:
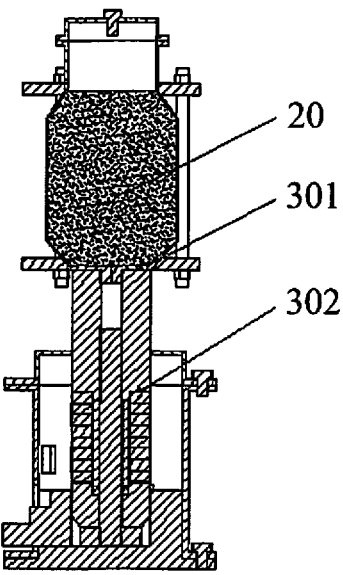
FIG. 3 is a sectional view of the device shown in FIG. 2.

As shown in FIG. 1 to FIG. 3, an embodiment of the present disclosure provides a method for reducing propellant curing residual stress by a high-energy acoustic beam and a device applying the method. The device comprises a high-energy acoustic beam generator and a high-energy acoustic beam transducer 30 which are electrically connected to each other, and a curing container 10 coupled to an emission port of the high-energy acoustic beam transducer 30. The device can be fixedly connected to a support structure 40. In some embodiments, the high-energy acoustic beam generator may be an ultrasonic generator, which is a device for converting the mains power into high-frequency alternating current corresponding to the transducer to drive the transducer 30 and is known as an electronic box, an ultrasonic drive power source, or an ultrasonic controller. In some embodiments, the high-energy acoustic beam transducer 30 may be an ultrasonic transducer, which is a device that converts inputted electric power into mechanical power (i.e., ultrasonic wave) and then transmits it, while consuming a small part of the power on its own.

As shown in FIG. 1, the method provided by the embodiment of the present disclosure comprises steps S1-S3.

In the step S1, a propellant slurry 20 is injected into a curing container 10 so as to wait for the propellant slurry 20 to start curing.

In particular, the propellant slurry 20 may be injected into the curing container 10 via an inject inlet 101, and the injected volume of the propellant slurry 20 may further be recorded at the same time. In generally, the propellant slurry 20 is in a colloidal or liquid state when it is just injected into the curing container 10, and starts curing after waiting a period of time. The waited period of time may be determined by calculating the reaction time of polymer molecules or by experience. Generally, it takes two or three days.

In the step S2, when the propellant slurry 20 starts curing, a high-energy acoustic beam generator and the high-energy acoustic beam transducer 30 are actuated to continuously emit high-energy acoustic beam to the propellant slurry 20 in the curing container 10 until the propellant slurry 20 is cured to form a propellant grain.

The high-energy acoustic beam is generally not introduced before the propellant slurry 20 starts curing, since the high-energy acoustic beam is able to cause an ultrasonic cavitation effect in a colloid or liquid and generate bubbles, which reduces the mechanical properties and stability of the propellant, and thus it is not allowed. For the reason, after all the propellant slurry 20 to be cured is injected into the curing container 10, the power source is turned on when the propellant slurry 20 starts curing, i.e., the high-energy acoustic beam generator and the high-energy acoustic beam transducer 30 are actuated, to generate the high-energy acoustic beam and feed it into the propellant slurry 20 that is about to start curing. As the propellant slurry 20 starts curing, the high-energy acoustic beam begins to modify the propellant slurry 20 at the same time. The high-energy acoustic beam generator and the high-energy acoustic beam transducer 30 may be electrically connected through a driving voltage transmission cable. The high-energy acoustic beam may be generated by the high-energy acoustic beam source 302 shown in FIG. 3. The high-energy acoustic beam is introduced in the whole process from the beginning to the ending of the curing of the propellant slurry 20. The high-energy acoustic beam sensitive to the stress may resist generation of the stress at any time. Meanwhile, the modification by the high-energy acoustic beam may make the particles of the propellant slurry 20 more compact, improve leveling property of the surface of the propellant slurry 20, facilitate escaping of the air in the propellant slurry 20, improve the mechanical properties and stability of the propellant slurry 20, and help to resist the generation of the residual stress. The propellant grain refers generally to the propellant whose curing has completed and which is in a solid state.

In the step S3, the high-energy acoustic beam generator and the high-energy acoustic beam transducer 30 are closed.

The method for reducing propellant curing residual stress by high-energy acoustic beam provided in the embodiment of the present disclosure introduces continuously the high-energy acoustic beam sensitive to the stress during the whole curing process from the propellant slurry 20 to the propellant grain. On the one hand, the high-frequency fluctuation energy of the high-energy acoustic beam is provided to the propellant slurry 20 in the curing process according to the plasticity-inducing effect of the high-energy acoustic beam to enhance the mechanical properties of the propellant slurry 20, which is sufficient to overcome and counteract the energy that causes the propellant slurry 20 to produce residual stress when the propellant cures, thereby reducing, when the propellant cures, the internal residual stress that is possible to be formed, and thus reducing the residual stress inside the propellant in an effective manner and effectively ensuring operation safety of the aerospace equipment. On the other hand, the high-energy acoustic beam with high-frequency and small-amplitude may make the particles of the propellant slurry 20 more compact, improve leveling property of the surface of the propellant slurry 20 and facilitate escaping of the air in the propellant slurry 20, so as to improve the mechanical properties and stability of the propellant slurry 20, make the propellant slurry 20 to reduce or prevent forming of the internal residual stress, eliminate the residual stress inside the propellant in an effective manner, and ensure operation safety of the aerospace equipment likewise.

Figure 4:
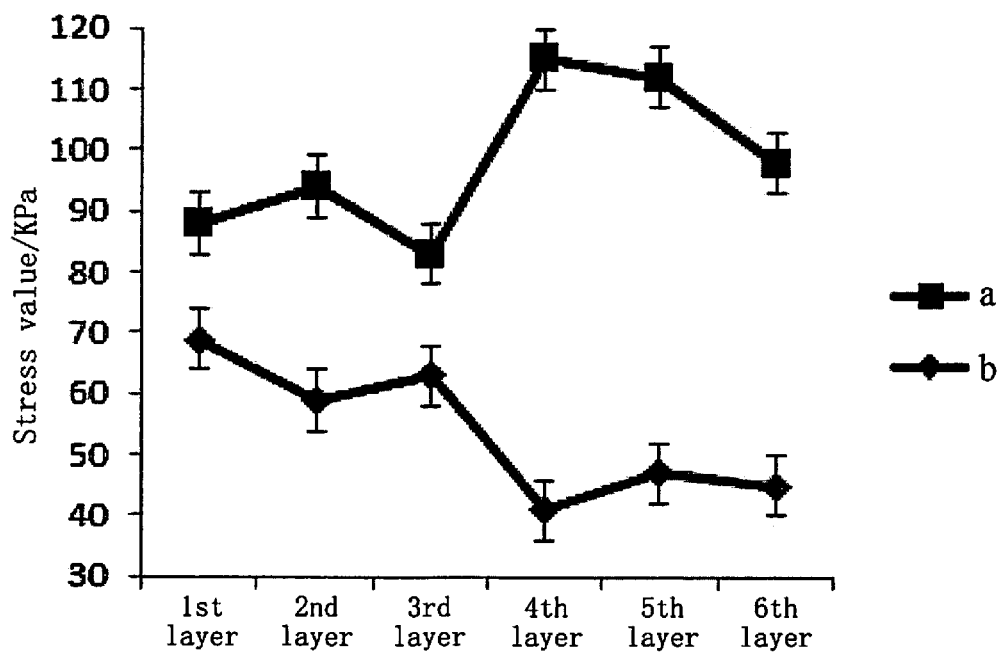
FIG. 4 is a comparison diagram of residual stresses of layers of the existing cured propellant and the cured propellant modified by the method provided in the embodiment of the present disclosure.

As shown in FIG. 4, the curve a indicates distribution of the residual stress values of layers of the existing cured propellant, and the curve b indicates distribution of the residual stress values of the layers of the cured propellant modified by the method of reducing propellant curing residual stress by high-energy acoustic beam provided by the embodiment of the present disclosure. By comparing the stress values of the layers in the figure, it demonstrates that the method provided by the embodiment of the present disclosure has a strong ability to reduce residual stress.

In order to obtain a better effect of the modification of the high-energy acoustic beam on the propellant slurry 20 and resist the generation of residual stresses inside the propellant in a more effective manner, the method may further include a step S21 before the step S2 and/or during the step S2. In the step S21, an operating frequency and voltage of the high-energy acoustic beam is adjusted according to a frequency of the high-energy acoustic beam transducer 30 used in the above embodiment to ensure phases of an output voltage and an output current consistent, so as to achieve a better modification effect and thereby effectively resist the generation of the residual stresses inside the propellant.

In some embodiments, the method may further include adjusting the operating frequency and voltage of the high-energy acoustic beam according to a waveform change displayed by an oscilloscope in the step S2. The oscilloscope may be electrically connected to the high-energy acoustic beam generator or the high-energy acoustic beam transducer 30. After being amplified in term of power, the changes in the voltage values or the current values of the high-energy acoustic beam are displayed in real time on the oscilloscope to reflect the energy level of the high-energy acoustic beam emitted into the propellant slurry 20. The larger the numerical values of the displayed voltage or current values are, the greater the energy level of the high-energy acoustic beam. On the contrary, the smaller the numerical values of the displayed voltage or current values are, the smaller the energy level of the high-energy acoustic beam. In this way, the input voltage and the input frequency may be adjusted at any time to adjust the energy level of the emitted high-energy acoustic beam, so that the high-energy acoustic beam can continuously be inputted in an suitable energy level so as to maintain a desirable modification state, and achieve a better modification result, which is to further resist the generation of residual stresses inside the propellant in an effective manner, effectively improve the mechanical properties and stability of the propellant slurry 20, and also effectively resist the generation of residual stresses inside the propellant.

In a preferred embodiment, the method may further include a step S22 before the step S2. In step S2, a required curing period of time is calculated based on a volume of the injected propellant slurry 20 and a frequency of the high-energy acoustic beam transducer, a timing of a timing alarm device is set based on the calculated curing period of time, and the timing alarm device is actuated; and the step S3 may further include that after the propellant slurry 20 is formed as the propellant grain, the above timing alarm device issues any one or more of alarms of bell-ringing, flashing and the like to remind an operator that the curing process of the propellant has finished and the modification by the high-energy acoustic beam may stop. In this way, the operator need not to monitor at all times and may do other works at the same time at a position where the bell-ringing can be seen or the flashing can be heard without conflict, which saves time and improves work efficiency.

More preferably, on the basis of the above embodiments, the method may further include automatically closing, after a predetermined period of time since the timing alarm device issues any one of more of the alarms of the bell-ringing, the flashing and the like in the step S3, the high-energy acoustic beam transducer 30 and the high-energy acoustic beam generator to stop working if the alarm(s) issued by the timing alarm device is not stopped. In this way, even if the operator fails to see the flashing or hear the bell-ring to turn off the power source in time and stop the modification by the high-energy acoustic beam, the modification can be automatically closed and stopped, which not only improves the safety of the method, but also saves power, reduces the loss of the machines, prolongs the service life of the machines and saves cost. In addition, the preset period of time can be set to an arbitrary time in advance for the timing alarm device.

In another preferred embodiment, the curing container may have a structure of two separated parts, and installation connection between the two parts is a connection in a tight and sealed manner. In one case, the method may further include a step S41 after the step S3. In the step S41, one of an upper separated part and a lower separated part of the curing container 10, which are connected to each other in a tight and sealed manner and separable up and down, is removed, and the propellant grain is taken out from the curing container 10. In another case, the method may further include a step S42 after the step S3. In the step S42, one of a left separated part and a right separated part of the curing container, which are connected to each other in a tight and sealed manner and separable left and right, is removed, and the propellant grain is taken out from the curing container 10. Regardless of the curing container being the structure of the upper and lower separated parts or the structure of the left and right separated parts, that is, whether removing the upper separated part or the lower separated part of the curing container 10 or removing the left separated part or the right separated part of the curing container 10, it is possible to take the cured propellant grain out from the curing container 10 in a complete and non-destructive manner. Therefore, the operation is simplified with reduced time and effort, and the curing container 10 can be reused multiple times, which is more economical and cost-effective.

In some embodiments, in order to make it easier for the cured propellant grain to come off when it is taken out, ensure integrity of the propellant grain and facilitate repeated multiple use of the curing container 10, a layer of release agent is further coated on an inner surface of the curing container 10 before the step S1, and the propellant slurry 20 is then injected into the curing container 10. In this way, after the propellant slurry 20 is cured, it is easier to completely take out the propellant grain.

In some embodiments, the method may further include a step S0 before the step S1 or the step S2. In the step S0, a coupling agent is evenly coated on a portion of the curing container 10 with which the high-energy acoustic beam transducer contacts, i.e., on a contact surface 301 shown in FIG. 3. The coupling agent is coated and applied evenly so that the high-energy acoustic beam is introduced uniformly for accuracy of adjustment during the modification, thereby ensuring the accuracy of adjustment data. The adjustment data can be retained and stored to improve efficiency of subsequent process. Further, in the step S0, the curing container 10 and the high-energy acoustic beam transducer 30 are coupled in a thigh and stable manner, which ensures an effective modification of the high-energy acoustic beam on the propellant slurry 20 during the curing, resulting in a better modification, and further ensures an effective resistance to the generation of residual stress inside the propellant.

The above descriptions are merely some embodiments of the present disclosure and are not intended to limit the present disclosure. Those skilled in the art are able to make various modifications and changes to the disclosure. Any modification, equivalent replacement, or improvement made within the spirit and principle of this disclosure should be included in the protection scope of this disclosure.

What is claimed is:

1. A method for reducing propellant curing residual stress by a high-energy acoustic beam, comprising the following steps:
   a step S1, in which a propellant slurry is injected into a curing container so as to wait for the propellant slurry to start curing;
   a step S2, in which when the propellant slurry starts curing, a high-energy acoustic beam generator and a high-energy acoustic beam transducer are actuated to continuously emit a high-energy acoustic beam sensitive to stress and having a high-frequency and small-amplitude to the propellant slurry in the curing container to until the propellant slurry is cured to form a propellant grain, wherein the high-energy acoustic beam sensitive to stress and having high-frequency and small-amplitude makes particles of the propellant slurry more compact, improves a leveling property of a surface of the propellant slurry and facilitates escaping of air in the propellant slurry, so as to improve mechanical properties and stability of the propellant slurry, make the propellant slurry reduce or prevent forming of the internal residual stress, and eliminate the residual stress inside the propellant; and
   a step S3, in which the high-energy acoustic beam generator and the high-energy acoustic beam transducer are closed.

2. The method as claimed in claim 1, further comprising a step S21 before or during the step S2, in which an operating frequency of the high-energy acoustic beam are adjusted based on a frequency of the high-energy acoustic beam transducer to ensure phases of an output voltage and an output current are consistent.

3. The method as claimed in claim 2, further comprising adjusting the operating frequency of the high-energy acoustic beam based on a waveform change displayed by an oscilloscope in the step S2.

4. The method as claimed in claim 1, further comprising a step S22 before the step S2, in which a curing period of time is calculated based on a volume of the injected propellant slurry and a frequency of the high-energy acoustic beam transducer, a timing of a timing alarm device is set based on the calculated curing period of time, and the timing alarm device is actuated; and the step S3 further comprising issuing, by the timing alarm device, any one or more of alarms of bell-ringing, flashing and the like after the propellant slurry is formed as the propellant grain.

5. The method as claimed in claim 4, further comprising automatically closing, after a predetermined period of time since the timing alarm device issues any one of more of the alarms of the bell-ringing, the flashing and the like in the step S3, the high-energy acoustic beam transducer and the high-energy acoustic beam generator to stop working if the alarm(s) issued by the timing alarm device is not stopped.

6. The method as claimed in claim 1, further comprising a step S41 after the step S3, in which one of an upper separated part and a lower separated part of the curing container, which are connected to each other in a tight and sealed manner and separable up and down, is removed, and the propellant grain is taken out from the curing container.

7. The method as claimed in claim 1, further comprising a step S42 after the step S3, in which one of a left separated part or a right separated part of the curing container, which are connected to each other in a tight and sealed manner and separable left and right, is removed, and the propellant grain is taken out from the curing container.

8. The method as claimed in claim 6, further comprising coating a layer of a release agent on an inner surface of the curing container before the step S1.

9. The method as claimed in claim 1, further comprising a step S0 before the step S1 or the step S2, in which a coupling agent is evenly coated on a portion of the curing container with which the high-energy acoustic beam transducer contacts, and coupling of the curing container to the high-energy acoustic beam transducer is made.

* * * * *